United States Patent
Carnes

(10) Patent No.: US 8,750,396 B2
(45) Date of Patent: Jun. 10, 2014

(54) SYSTEM, METHOD, AND SOFTWARE FOR COMMUNICATING WITH MEDICAL DEVICES

(75) Inventor: Tony C. Carnes, Gainesville, FL (US)

(73) Assignee: Covidien LP, Mansfield, MA (US)

(*) Notice: Subject to any disclaimer, the term of this patent is extended or adjusted under 35 U.S.C. 154(b) by 113 days.

(21) Appl. No.: 13/568,445

(22) Filed: Aug. 7, 2012

(65) Prior Publication Data

US 2014/0044201 A1 Feb. 13, 2014

(51) Int. Cl.
*H04L 27/00* (2006.01)

(52) U.S. Cl.
USPC ........................................ 375/259

(58) Field of Classification Search
USPC ........ 375/259, 219, 345; 705/14.58; 709/203, 709/217
See application file for complete search history.

(56) References Cited

U.S. PATENT DOCUMENTS

| 2008/0208794 A1* | 8/2008 | Andriamananjara et al. .... 707/1 |
| 2012/0215860 A1* | 8/2012 | Bohner et al. ................ 709/206 |
| 2013/0290020 A1* | 10/2013 | Brush ............................. 705/3 |

* cited by examiner

*Primary Examiner* — Khai Tran

(57) ABSTRACT

A method for communicating with medical devices includes receiving, at a medical device communication interface, patient parameters from a first and second medical device in a respective first and second format. The method further includes identifying, at the medical device communication interface, a first and second protocol associated with the patient parameters by comparing the patient parameters and the first and second format to a predefined schema. The method further includes modifying, at the medical device communication interface, a respective configuration parameter for each of the first and second medical devices. The method further includes translating the patient parameters based on the first and second identified protocols and the respective configuration parameter for each of the first and second medical devices.

20 Claims, 4 Drawing Sheets

SYSTEM, METHOD, AND SOFTWARE FOR COMMUNICATING WITH MEDICAL DEVICES

TECHNICAL FIELD

The present disclosure relates generally to medical device management, and more particularly to a system, method, and software for communicating with medical devices.

BACKGROUND

Many medical devices support multiple output techniques. For example, certain medical devices may output data in a textual format while other medical devices may output data in binary format. Certain medical devices may have different rates of output for the output data.

SUMMARY

According to the present disclosure, disadvantages and problems associated with previous techniques for medical device management may be reduced or eliminated.

In certain embodiments, a method for communicating with medical devices includes receiving, at a medical device communication interface, a first plurality of patient parameters from a first medical device in a first format. The method further includes receiving, at the medical device communication interface, a second plurality of patient parameters from a second medical device in a second format. The method further includes identifying, at the medical device communication interface, a first protocol associated with the first plurality of patient parameters and the first medical device by comparing the first plurality of patient parameters and the first format to a predefined schema. The method further includes identifying, at the medical device communication interface, a second protocol associated with the second plurality of patient parameters and the second medical device by comparing the second plurality patient parameters and the second format to the predefined schema. The method further includes modifying, at the medical device communication interface, a respective configuration parameter for each of the first and second medical devices, the configuration parameter comprising at least one of a baud rate parameter, an encoding parameter, a data output parameter, a count parameter, a syntax parameter, and a software identification parameter. The method further includes translating the first and second plurality of patient parameters based on the first and second identified protocols and the respective configuration parameter for each of the first and second medical devices.

Certain embodiments of the present disclosure may provide one or more technical advantages. Conventional communication with medical devices requires the creation of a specific custom device driver that can read, parse, and interpret information coming from the output port of the medical device. Many medical devices support multiple output protocols for communicating with external systems. As more external systems desire to communicate with the device, some end users may not want to change the protocol on the device to match that which is desired by different systems. In certain embodiments of the present disclosure, the medical device communication interface is operable to receive, parse, interpret, and translate medical device output, including patient parameters, in multiple formats. Thus, at least one example advantage is the reduction in the number of custom device drivers that need to be implemented. A second example advantage is that if the output port on a device is already in use by other systems, the medical device communication interface may identify the protocol in use and adapt accordingly. In addition, the medical device communication interface may modify a configuration parameter that may be dynamically implemented in a parsing and translation algorithm, such as: (1) a baud rate parameter (e.g., switching between any of a number of baud rates such as 2400, 4800, 9600, 14400, 28800, and 57600 baud rates); (2) an encoding parameter (e.g., switching between ASCII and binary); (3) a data output parameter (e.g., switching between a request/response mode and a streaming mode); (4) a count parameter (e.g., a modification to expect more or fewer parameters); (5) a syntax parameter (e.g., a modification to expect information in different locations); and (6) a software identification parameter (e.g., a modification of a software identification parameter to a particular operating system version and output version of the software).

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Figure 1:
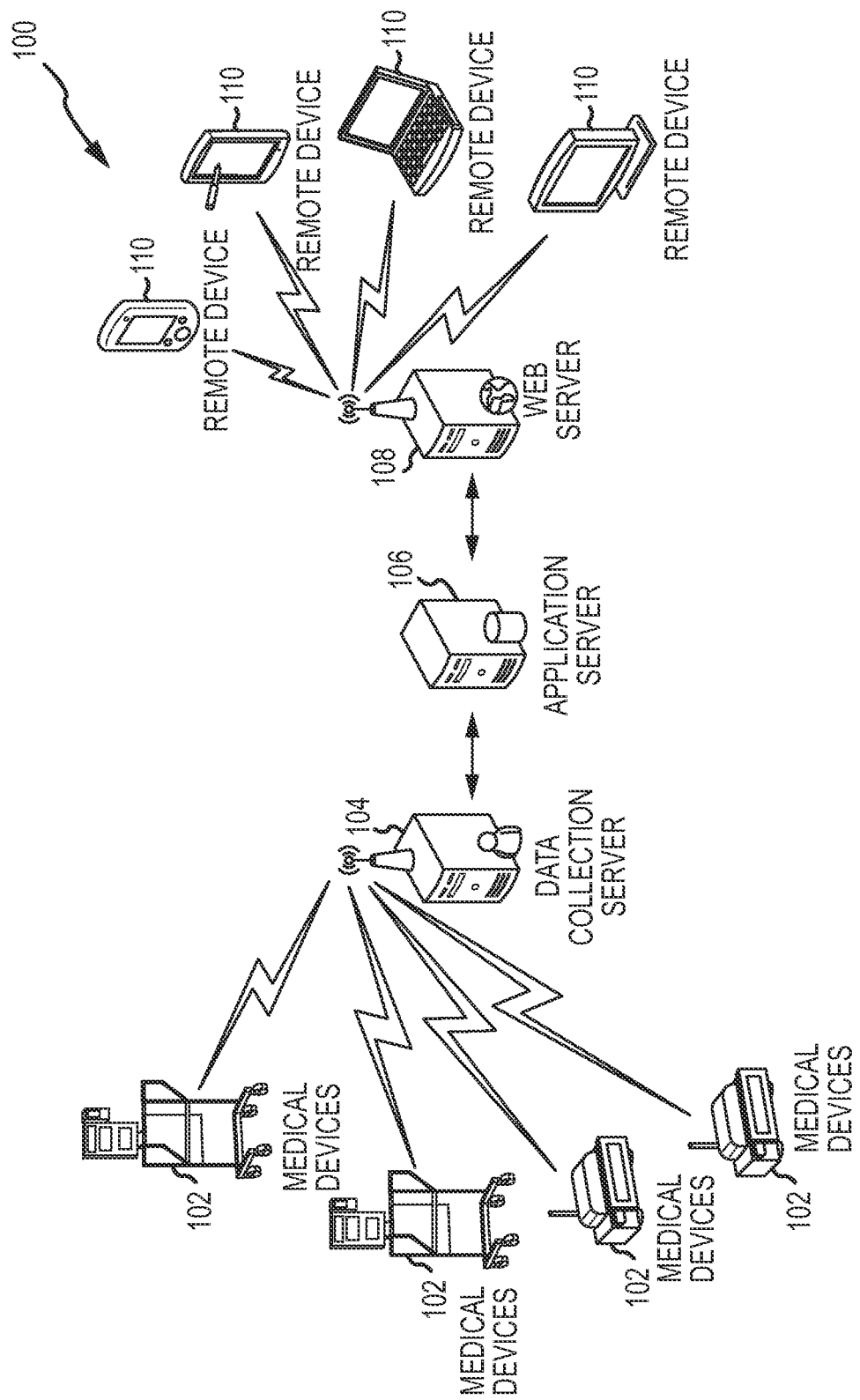
FIG. 1 illustrates an example system for communicating with medical devices, according to certain embodiments of the present disclosure.

FIG. 1 illustrates an example system 100 for communicating with medical devices, according to certain embodiments of the present disclosure. System 100 includes one or more medical devices 102, a data collection server 104, an application server 106, a web server 108, and one or more remote devices 110. According to one embodiment, system 100 is operable to monitor medical devices 102 and transform patient parameters into display parameters. In certain embodiments, medical devices 102 generate patient parameters or store patient parameters input by a user, such as a clinician. Patient parameters may refer to any patient identifiers, medical history, clinician notes, alarm thresholds, alarm events, device settings, measurements of values indicating physiological conditions such as oxygen saturation levels, pulse rates, heart rates, other vital signs, and any other output data from medical devices 102. Each medical device 102 may be connected to data collection server 104, which stores the patient parameters in a database. Application server 106 retrieves the patient parameters from the database and processes the patient parameters into display parameters for web server 108. Remote devices 110 request and receive the display parameters and display the display parameters through a browser, thereby enabling clinicians using the remote devices 110 to view the display parameters in remote locations. As described in more detail below, a medical device communication interface at data collection server 104 includes logic that may receive, parse, interpret, and translate patient parameters received from different medical devices 102.

Although this particular implementation of system 100 is illustrated and primarily described, the present disclosure contemplates any suitable implementation of system 100 according to particular needs. For example, although this implementation of the medical device communication interface is illustrated with remote devices 110 that may be using a web interface or a client/server interface, this disclosure contemplates any suitable implementation of the medical device communication interface. In certain embodiments, alert notifications generated by the medical device communication interface may be generated and displayed directly at medical devices 102 and all implementation details may be included in medical devices 102. In addition, a component of system 100 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

System 100 may include one or more medical devices 102. Medical devices 102 may be any devices that are used for tracking or treating patients. For example, medical devices 102 may include a ventilator connected to a patient to deliver respiratory therapy. As another example, medical devices 102 may include a pulse oximeter that monitors the oxygen saturation of a patient's blood. As another example, medical devices 102 may include a device for tracking a patient without monitoring physiological conditions. In short, medical devices 102 may include any suitable combination of software, firmware, and hardware used to support any medical function. It should be noted that any suitable number of medical devices 102 may be included in system 100. In addition, there may be multiple groups of medical devices 102 in system 100.

According to one embodiment, in addition to performing a medical function, medical devices 102 may generate output data tracked by medical devices 102. For example, the ventilator may generate entries indicating the average volume of air expelled in each breath. The ventilator may generate entries including the parameter settings used by the ventilator and an identification of whether any alarms have been triggered. The ventilator may store the generated entries in local memory and output the entries. In some embodiments, medical devices 102 may generate output data that is related to tracking patient identifications or locations, without necessarily generating data related to a physiological condition. In certain embodiments, medical devices 102 may output data in response to a data request. In certain other embodiments, medical devices 102 may constantly stream output data.

Medical devices 102 may be communicatively coupled to data collection server 104 via a network, according to one embodiment. The network facilitates wireless or wireline communication. The network may communicate, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, medical devices may be communicatively coupled to other suitable devices including data collection server 104, application server 106, web server 108, and remote devices 110.

System 100 may include one or more data collection servers 104, referred to primarily in the singular throughout this disclosure. Data collection server 104 may include one or more electronic computing devices operable to receive, transmit, process, and store data associated with system 100. For example, data collection server 104 may include one or more general-purpose PCs, Macintoshes, workstations, Unix-based computers, server computers, one or more server pools, or any other suitable devices. In certain embodiments, data collection server 104 includes a web server. In short, data collection server 104 may include any suitable combination of software, firmware, and hardware. Although a single data collection server 104 is illustrated, the present disclosure contemplates system 100 including any suitable number of data collection servers 104. Moreover, although referred to as a data collection server, the present disclosure contemplates data collection server 104 comprising any suitable type of processing device or devices.

According to one embodiment, data collection server 104 receives patient parameters from medical devices 102. For example, data collection server 104 may request patient parameters from a medical device 102 and receives patient parameter sets from the medical device 102 in response to the request. As another example, data collection server 104 may receive streamed output data from a medical device 102. As another example, data collection server 104 may be configured to periodically request new data from medical device 102. Data collection server 104 may map the received patient parameters to match internal fields in the database and then transmit the data to a database, according to one embodiment. The stored data may be accessed by application server 106.

System 100 may include one or more application servers 106, referred to primarily in the singular throughout this disclosure. Application server 106 may include one or more electronic computing devices operable to receive, transmit, process, and store data associated with system 100. For example, application server 106 may include one or more general-purpose PCs, Macintoshes, workstations, Unix-based computers, server computers, one or more server pools, or any other suitable devices. In short, application server 106 may include any suitable combination of software, firmware, and hardware. Although a single application server 106 is illustrated, the present disclosure contemplates system 100 including any suitable number of application servers 106. Moreover, although referred to as an application server, the present disclosure contemplates application server 106 comprising any suitable type of processing device or devices.

According to one embodiment, application server 106 creates a data service that runs on a conventional web services platform for transmitting data to web server 108. For example, application server 106 may create webpage data using the patient parameters, and that webpage data is transmitted to web server 108 for display. Application server 106 may maintain an activity log that logs data requests from remote devices 110 to track certain activities performed at the remote devices 110. Therefore, if a clinician selects a particular patient representation to zoom in and view ventilator data specific to that patient, that selection may trigger a data request that is logged by application server 106. When creating the webpage data, application server 106 may compare the current parameter settings of the ventilator, as indicated by entries in the patient parameter set, to prior parameter settings. If any changes are detected, application server 106 may flag those changes for presentation to users on remote devices 110. Specifically, application server 106 may create data causing the depiction of the changed patient parameters on the remote devices 110 to change color. Application server 106 may create additional data that causes a pop-up window to appear on the mobile device when any of the changed patient parameters are selected. That window may list all of the changed patient parameters and provides a single button through which a user may indicate that that the changed patient parameters have been viewed. If that button is activated, the mobile device may transmit a message to application server 106 and application server 106 may then unflag those patient parameters, such that the depiction of those patient parameters on remote device 110 may return to the original color. In certain embodiments, application server 106 may transmit data directly to remote devices 110.

System 100 may include one or more web servers 108, referred to primarily in the singular throughout this disclosure. Web server 108 may include one or more electronic computing devices operable to receive, transmit, process, and store data associated with system 100. For example, web server 108 may include one or more general-purpose PCs, Macintoshes, workstations, Unix-based computers, server computers, one or more server pools, or any other suitable devices. In short, web server 108 may include any suitable combination of software, firmware, and hardware. Although a single web server 108 is illustrated, the present disclosure contemplates system 100 including any suitable number of web servers 108. Moreover, although referred to as a web server, the present disclosure contemplates web server 108 comprising any suitable type of processing device or devices.

According to one embodiment, web server 108 creates a data service that runs on a conventional web services platform for receiving data from application server 106 and transmitting data to remote devices 110. For example, web server 108 may receive webpage data from application server 106 and transmitted, upon request in certain embodiments, to remote devices 110.

System 100 may include one or more remote devices 110. Remote devices 110 may be any device that provides output to and can receive input from a user, such as a clinician. Each remote device 110 may include one or more computer systems at one or more locations. Each computer system may include any appropriate input devices (such as a keypad, touch screen, mouse, or other device that can accept input), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device.

According to one embodiment, remote devices 110 display one or more web pages hosted by application server 106 and/or web server 108 with patient parameters from medical devices 102. For example, a clinician may activate a browser on remote device 110 and navigate to the web page hosted by web server 108. The browser may render the web page, which includes patient parameters generated by medical devices 102. The web page may provide a summary of all the medical devices 102 under a clinician's responsibility. In addition, the web may display a detailed view that displays specific device data, therapy parameter data, and alarm status data.

Although FIG. 1 depicts separate devices for data collection server 104, application server 106, and web server 108, it will be readily apparent that the functions of these devices may be combined into a single device that receives patient parameters from medical devices 102 and transforms the patient parameters into display parameters. It will also be understood that this single device may alternatively transmit the display parameters to remote device 110. In certain embodiments, data collection server 104 may be a bedside device that receives patient parameters from medical devices 102.

It will also be understood that the functions may be allocated differently than shown, with application server 106 additionally performing the functions of web server 108 or the functions of data collection server 104. In another embodiment, a single device may receive patient parameters, transform those patient parameters into display parameters, and display the display parameters on a screen.

A user of system 100 may connect many different types of medical devices 102 to examine a combination of patient parameters. Each medical device 102 may have a proprietary format and/or protocol for outputting patient parameters. For example, in order to communicate with the proprietary format and/or protocol for medical devices 102, a particular custom device driver may need to be created that can read, parse, and interpret information coming from the output port of the medical device. However, utilizing a custom device driver for each medical device 102 may be costly and as more external systems desire to communicate with medical devices 102, some end users may not want to change the protocol on medical devices 102 to match that which is desired by different systems.

In certain embodiments of the disclosure, system 100 may include a medical device communication interface. The medical device communication interface may refer to any suitable hardware and/or software operable to receive, parse, interpret, and translate patient parameters received from different medical devices 102 at data collection server 104. Therefore, the medical device communication interface may sense the output format currently in use and adapt the parsing algorithm accordingly. Thus, in certain embodiments, the medical device communication interface operates as a global device driver that can accept information in multiple formats and may be implemented where the output port on medical devices 102 are already in use by other systems. Additional details of example embodiments of the medical device communication interface are discussed below with reference to FIGS. 2-4.

Figure 2:
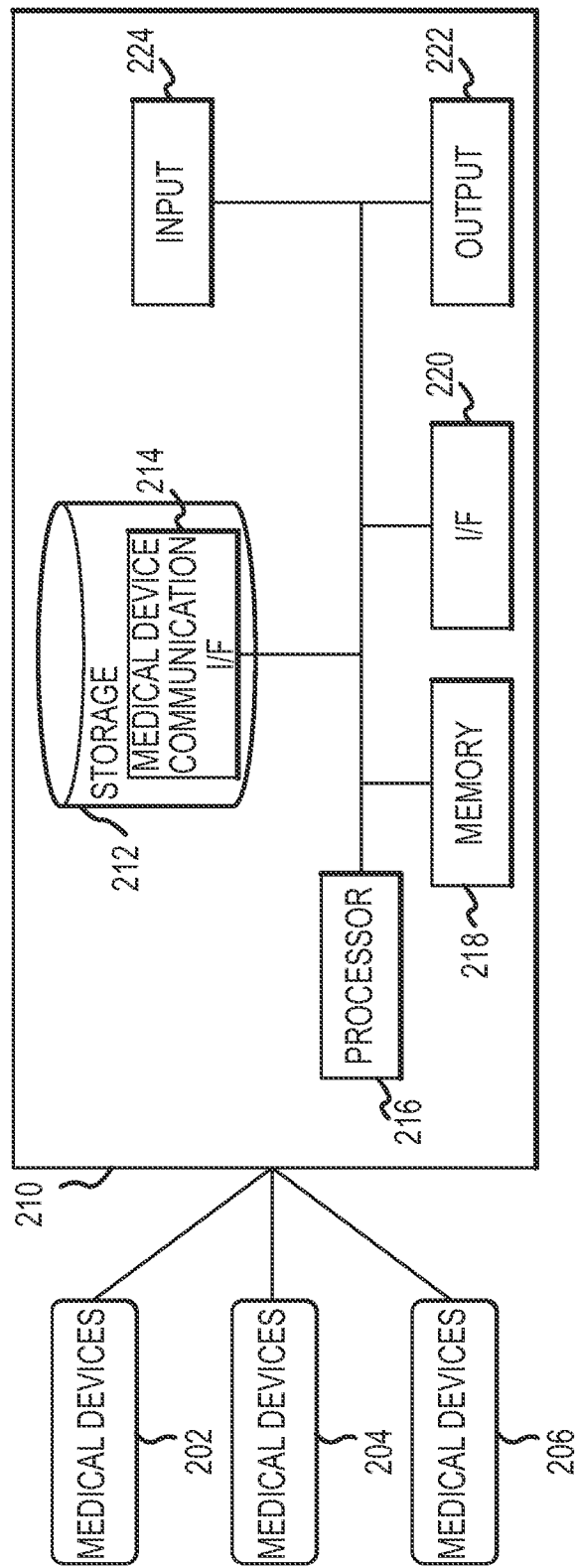
FIG. 2 illustrates an example data collection server of the system for communicating with medical devices in FIG. 1, according to certain embodiments of the present disclosure.

FIG. 2 illustrates an example data collection server 210 of the system 100 for communicating with medical devices in FIG. 1, according to certain embodiments of the present disclosure. Data collection server 210 may be substantially similar to data collection server 104 of FIG. 1. In FIG. 2, a data collection server 210 is shown as a server communicatively coupled with a medical device 202, a medical device 204, and a medical device 206. Medical devices 202-206 may be substantially similar to medical devices 102 of FIG. 1. Data collection server 210 includes a storage device 212, a medical device communication interface 214, a processor 216, a memory 218, a communication interface (I/F) 220, an output device 222, and an input device 224, which are discussed in further detail below. Although this particular implementation of data collection server 210 is illustrated and primarily described, the present disclosure contemplates any suitable implementation of data collection server 210 according to particular needs.

Storage device 212 may include any suitable device operable for storing data and instructions. Storage device 212 may include, for example, a magnetic disk, flash memory, optical disk, or other suitable data storage device.

Medical device communication interface 214 may include any suitable logic embodied in computer-readable media, and when executed, that is operable to receive, parse, interpret, and translate patient parameters received from different medical devices 102. For example, medical device communication interface 214 may include logic for receiving patient parameters from medical devices 202-206, identifying a protocol that is associated with each respective medical device by comparing the first plurality of patient parameters and the first format to a predefined schema, modifying a configuration parameter for each medical device, and translating the patient parameters based on the identified protocols and the respective configuration parameter for each medical device. In certain embodiments, translating the patient parameters may refer to translating the received patient parameters into a format suitable for storage in a database. Additional details of the protocols, predefined schema, and configuration parameters are provided below with reference to FIG. 3.

Processor 216 may include any suitable device operable to execute instructions and manipulate data to perform operations for medical device communication interface 214. Processor 216 may include, for example, any type of central processing unit (CPU).

Memory 218 may include any computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server). Memory 218 may comprise any other computer-readable tangible medium, or a combination of any of the preceding.

I/F 220 may include any suitable device operable to receive input for medical device communication interface 214, send output from medical device communication interface 214, perform suitable processing of the input or output or both, communicate to other devices, or any combination of the preceding. I/F 220 may include appropriate hardware (for example, a modem, network interface card, etc.) and software, including protocol conversion and data processing capabilities, to communicate through a LAN, WAN, or other communication system that allows medical device communication interface 214 to communicate to other devices. I/F 220 may include one or more ports, conversion software, or a combination of any of the preceding.

Output device 222 may include any suitable device operable for displaying information to a user. Output device 222 may include, for example, a video display, a printer, a plotter, or other suitable output device. In certain embodiments, output device 222 may reformat data in any suitable format to be transmitted to other systems.

Input device 224 may include any suitable device operable to input, select, and/or manipulate various data and information. Input device 224 may include, for example, a keyboard, mouse, graphics tablet, joystick, light pen, microphone, scanner, or other suitable input device.

Modifications, additions, or omissions may be made to data collection server 210 without departing from the scope of the disclosure. The components of data collection server 210 may be integrated or separated. Moreover, the operations of data collection server 210 may be performed by more, fewer, or other components. For example, although medical device communication interface 214 is displayed as part of storage device 212, medical device communication interface 214 may be stored in any suitable location, including in another suitable device shown in FIG. 1, and the operations of medical device communication interface 214 may be performed by more than one component. Additionally, operations of data collection server 210 may be performed using any suitable logic. As used in this document, "each" refers to each member of a set or each member of a subset of a set. Further details of an example data collection server 210 and the operations of medical device communication interface 214 are provided below with reference to FIG. 3.

Figure 3:
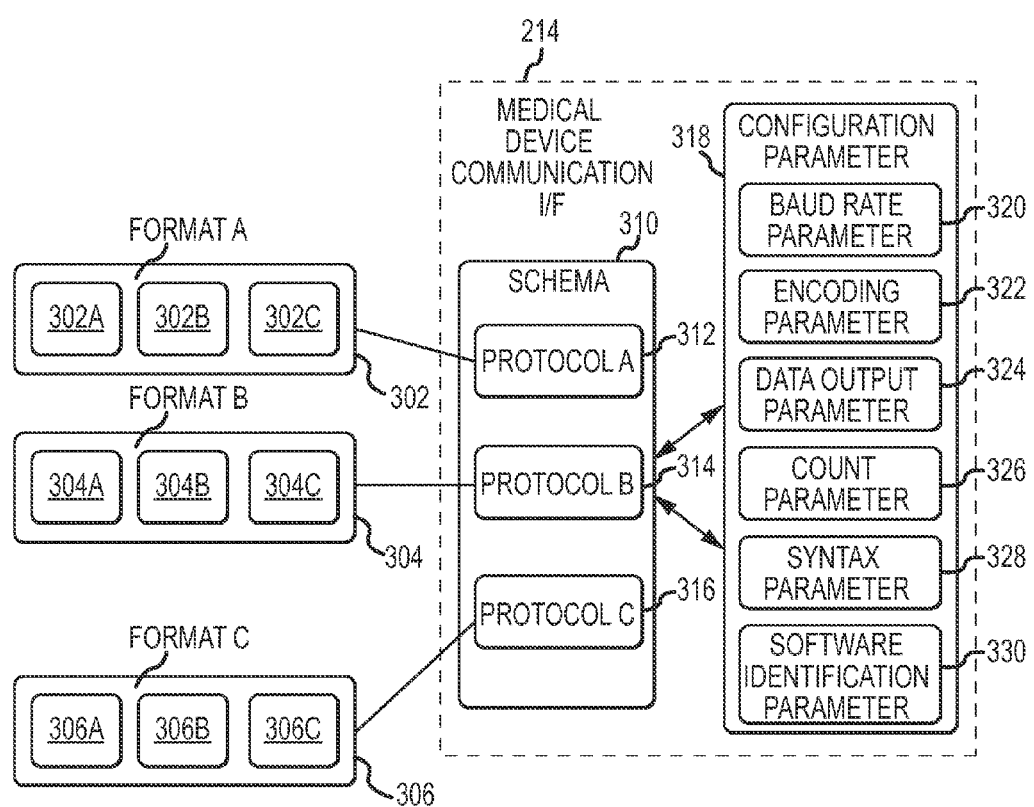
FIG. 3 illustrates one embodiment of an example operation of medical device communication interface of FIG. 2, according to certain embodiments of the present disclosure.

FIG. 3 illustrates one embodiment of an example operation of medical device communication interface 214 of FIG. 2, according to certain embodiments of the present disclosure. The illustrated embodiment includes a format 302, a format 304, and a format 306 and associated patient parameters, such as patient parameters 302A, 302B, and 302C in format 302, which may be generated by respective medical devices, such as medical devices 102 in FIG. 1. A format may refer to any systematic arrangement of patient parameters and may include any of a data speed, data type, data count, data encoding, data syntax, data format, or any combination thereof. In certain embodiments, each of formats 302-306 may represent a particular proprietary format for medical devices 102. For example, format 302 may be associated with patient parameters output from a first medical device 102 in FIG. 1 and format 304 may be associated with a second medical device 102 in FIG. 1.

According to certain embodiments of the disclosure, formats 302-306 and their associated patient parameters may be examined at medical device communication interface 214 to identify a particular protocol associated with the format by comparing respective patient parameters and formats to a predefined schema 310. Schema 310 may comprise any suitable hardware and/or software that includes one or more predefined protocols 312-316 and certain configuration parameters associated with protocols 312-316. For example, in the illustrated embodiment, patient parameters 302A, 302B, and 302C and format 302 may be compared with protocols 312-316 in schema 310 to identify a matching protocol, such as 312 in the illustrated embodiment that matches format 302. As another example, in the illustrated embodiment, patient parameters 304A, 304B, and 304C and format 304 may be compared with protocols 312-316 in schema 310 to identify a matching protocol, such as 314 in the illustrated embodiment that matches protocol 304.

Based on the identified protocol, medical device communication interface 214 may modify an associated configuration parameter for receiving, parsing, and translating patient parameters and other data received from the medical devices, according to certain embodiments. In certain embodiments, schema 310 may include certain configuration parameters, or modifications to configuration parameters, based on the identified protocol. For example, in an example embodiment where format 302 matches with protocol 312, schema 310 may include a configuration parameter associated with protocol 312 that indicates that a modification of a baud rate parameter from a 9600 baud rate to a 14400 baud rate is appropriate for format 302. As another example, schema 310 may include a configuration parameter associated with protocol 312 that indicates that a modification of an encoding parameter from ASCII encoding to binary encoding (or binary encoding to ASCII encoding) is appropriate for format 302. As yet another example, schema 310 may include a configuration parameter associated with protocol 312 that indicates that a modification of a data output parameter from a request/response mode (e.g., where a medical device is polled for information) to a streaming mode (e.g., where a medical device streams output data without being polled) is appropriate for format 302. As yet another example, schema 310 may include a configuration parameter associated with protocol 312 that indicates a modification of a count parameter to expect a particular number of patient parameters. In the example, the count parameter may indicate a number of patient parameters, such as three patient parameters 302A, 302B, and 302C that are expected in a particular period of time according to the identified protocol. As yet another example in the example embodiment where format 302 matches with protocol 312, schema 310 may include a configuration parameter associated with protocol 312 that indicates a modification of a syntax parameter to expect a particular sequence of patient parameters and/or a particular number of parameter slots based on an output protocol for a medical device. In the example, the syntax parameter may indicate a particular sequence of patient parameters, such as oxygen saturation data in patient parameter 302A, pulse rate in patient parameter 302B, and oximeter alarms in patient parameter 302C, that are expected according to the identified protocol. Schema 310 may include any other suitable configuration parameter for receiving and translating patient parameters based on an identified protocol, such as device identification parameters, software identification parameters, operating system identification parameters, network parameters, parsing algorithm parameters, and any other similar parameters.

As described above, in certain embodiments, based on the identified protocol and the one or more modified configuration parameters, medical device communication interface 214 may parse, translate, or perform any other similar operation on the patient parameters received from different medical devices 102. For example, medical device communication interface 214 may identify a particular protocol for each of two different streams of data received from two different medical devices, modify configuration parameters described above based on the respective identified protocols, and translate the respective patient parameters based on the identified protocols and the respective modified configuration parameter for each medical device. In certain embodiments, translating the patient parameters may refer to translating the received patient parameters into a format suitable for storage in a database. In certain other embodiments, translating the patient parameters may refer to translating, reformatting, and forwarding the data to other systems.

According to one embodiment, medical device communication interface 214 does not require a new communication driver for each heterogeneous medical device attached to the system. Instead, medical device communication interface 214 facilitates communication with heterogeneous medical devices without changing the output protocol of the device. Based on the schema 310 and configuration parameters associated with predefined protocols 312-316, medical device communication interface 214 may identify an output format currently in use and adapt its parsing and translation algorithm accordingly.

Figure 4:
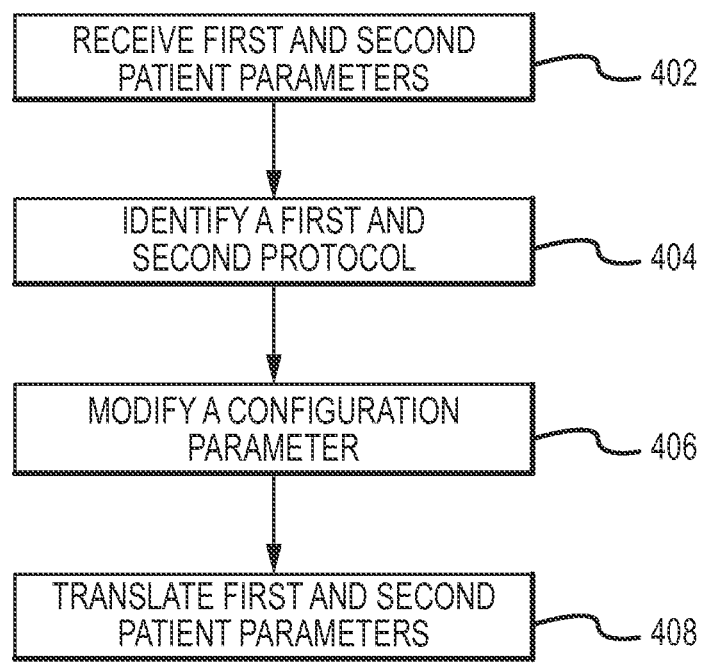
FIG. 4 illustrates an example method for communicating with medical devices, according to certain embodiments of the present disclosure.

FIG. 4 illustrates an example method for communicating with medical devices, according to certain embodiments of the present disclosure. The method begins at step 402 where patient parameters are received from a first and second medical device in a respective first and second format. At step 404, a first and second protocol associated with the patient parameters is identified by comparing the patient parameters and the first and second format to a predefined schema. At step 406, a respective configuration parameter for each of the first and second medical devices is modified. At step 408, the patient parameters are translated based on the first and second identified protocols and the respective configuration parameter for each of the first and second medical devices. It should be understood that some of the steps illustrated in FIG. 4 may be combined, modified or deleted where appropriate, and additional steps may be added to the flowchart. Additionally, as indicated above, steps may be performed in any suitable order without departing from the scope of the disclosure.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A method for communicating with medical devices, comprising:
   receiving, at a medical device communication interface, a first plurality of patient parameters from a first medical device in a first format;
   receiving, at the medical device communication interface, a second plurality of patient parameters from a second medical device in a second format;
   identifying, at the medical device communication interface, a first protocol associated with the first plurality of patient parameters and the first medical device by comparing the first plurality of patient parameters and the first format to a predefined schema;
   identifying, at the medical device communication interface, a second protocol associated with the second plurality of patient parameters and the second medical device by comparing the second plurality of patient parameters and the second format to the predefined schema;
   modifying, at the medical device communication interface, a respective configuration parameter for each of the first and second medical devices, the configuration parameter comprising at least one of a baud rate parameter, an encoding parameter, a data output parameter, a count parameter, a syntax parameter, and a software identification parameter; and
   translating the first and second plurality of patient parameters based on the first and second identified protocols and the respective configuration parameter for each of the first and second medical devices.

2. The method of claim 1, wherein modifying, at the medical device communication interface, the respective configuration parameter for each of the first and second medical devices comprises modifying the baud rate parameter from a 9600 baud rate to a 14400 baud rate.

3. The method of claim 1, wherein modifying, at the medical device communication interface, the respective configuration parameter for each of the first and second medical devices comprises modifying the encoding parameter from ASCII encoding to binary encoding.

4. The method of claim 1, wherein modifying, at the medical device communication interface, the respective configuration parameter for each of the first and second medical devices comprises modifying the data output parameter from streaming mode to polling mode.

5. The method of claim 1, wherein modifying, at the medical device communication interface, the respective configuration parameter for each of the first and second medical devices comprises modifying the syntax parameter to a particular sequence of patient parameters based on an output protocol for a medical device.

6. The method of claim 1, wherein modifying, at the medical device communication interface, the respective configuration parameter for each of the first and second medical devices comprises modifying the software identification parameter to a particular operating system version and output version of the respective software at the first and second medical devices.

7. The method of claim 1, further comprising:
receiving, at the medical device communication interface, a third plurality of patient parameters from a third medical device in a third format;
identifying, at the medical device communication interface, a third protocol associated with the third plurality of patient parameters and the third medical device by comparing the third plurality of patient parameters and the third format to a predefined schema;
modifying, at the medical device communication interface, a respective configuration parameter for the third medical device; and
translating the third plurality of patient parameters based on the third identified protocol and the respective configuration parameter for the third medical device.

8. A system for communicating with medical devices, comprising:
one or more processing units operable to:
receive, at a medical device communication interface, a first plurality of patient parameters from a first medical device in a first format;
receive, at the medical device communication interface, a second plurality of patient parameters from a second medical device in a second format;
identify, at the medical device communication interface, a first protocol associated with the first plurality of patient parameters and the first medical device by comparing the first plurality of patient parameters and the first format to a predefined schema;
identify, at the medical device communication interface, a second protocol associated with the second plurality of patient parameters and the second medical device by comparing the second plurality of patient parameters and the second format to the predefined schema;
modify, at the medical device communication interface, a respective configuration parameter for each of the first and second medical devices, the configuration parameter comprising at least one of a baud rate parameter, an encoding parameter, a data output parameter, a count parameter, a syntax parameter, and a software identification parameter; and
translate the first and second plurality of patient parameters based on the first and second identified protocols and the respective configuration parameter for each of the first and second medical devices.

9. The system of claim 8, wherein the one or more processing units are operable to modify the baud rate parameter from a 9600 baud rate to a 14400 baud rate.

10. The system of claim 8, wherein the one or more processing units are operable to modify the encoding parameter from ASCII encoding to binary encoding.

11. The system of claim 8, wherein the one or more processing units are operable to modify the data output parameter from streaming mode to polling mode.

12. The system of claim 8, wherein the one or more processing units are operable to modify the syntax parameter to a particular sequence of patient parameters based on an output protocol for a medical device.

13. The system of claim 8, wherein the one or more processing units are operable to modify the software identification parameter to a particular operating system version and output version of the respective software at the first and second medical devices.

14. The system of claim 8, wherein the one or more processing units are operable to:
receive, at the medical device communication interface, a third plurality of patient parameters from a third medical device in a third format;
identify, at the medical device communication interface, a third protocol associated with the third plurality of patient parameters and the third medical device by comparing the third plurality of patient parameters and the third format to a predefined schema;
modify, at the medical device communication interface, a respective configuration parameter for the third medical device; and
translate the third plurality of patient parameters based on the third identified protocol and the respective configuration parameter for the third medical device.

15. Software for communicating with medical devices, the software embodied in a computer-readable medium and when executed operable to:
receive, at a medical device communication interface, a first plurality of patient parameters from a first medical device in a first format;
receive, at the medical device communication interface, a second plurality of patient parameters from a second medical device in a second format;
identify, at the medical device communication interface, a first protocol associated with the first plurality of patient parameters and the first medical device by comparing the first plurality of patient parameters and the first format to a predefined schema;
identify, at the medical device communication interface, a second protocol associated with the second plurality of patient parameters and the second medical device by comparing the second plurality of patient parameters and the second format to the predefined schema;
modify, at the medical device communication interface, a respective configuration parameter for each of the first and second medical devices, the configuration parameter comprising at least one of a baud rate parameter, an encoding parameter, a data output parameter, a count parameter, a syntax parameter, and a software identification parameter; and
translate the first and second plurality of patient parameters based on the first and second identified protocols and the respective configuration parameter for each of the first and second medical devices.

16. The software of claim 15, wherein the software is further operable to modify the baud rate parameter from a 9600 baud rate to a 14400 baud rate.

17. The software of claim 15, wherein the software is further operable to modify the encoding parameter from ASCII encoding to binary encoding.

18. The software of claim 15, wherein the software is further operable to modify the data output parameter from streaming mode to polling mode.

19. The software of claim 15, wherein the software is further operable to modify the syntax parameter to a particular sequence of patient parameters based on an output protocol for a medical device.

20. The software of claim 15, wherein the software is further operable to:
- receive, at the medical device communication interface, a third plurality of patient parameters from a third medical device in a third format;
- identify, at the medical device communication interface, a third protocol associated with the third plurality of patient parameters and the third medical device by comparing the third plurality of patient parameters and the third format to a predefined schema;
- modify, at the medical device communication interface, a respective configuration parameter for the third medical device; and
- translate the third plurality of patient parameters based on the third identified protocol and the respective configuration parameter for the third medical device.

* * * * *